Jan. 17, 1933.                W. E. URSCHEL                 1,894,802
                               BEET HARVESTER
                            Filed Dec. 5, 1929            5 Sheets-Sheet 3
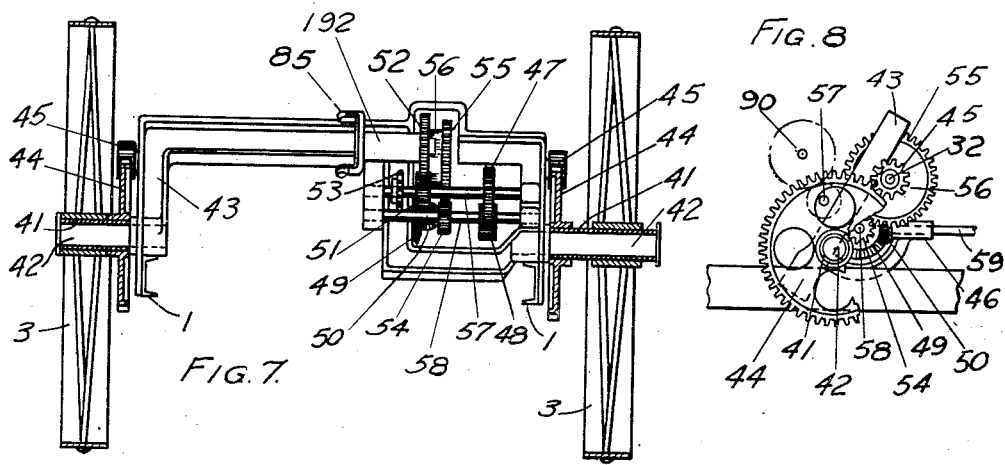
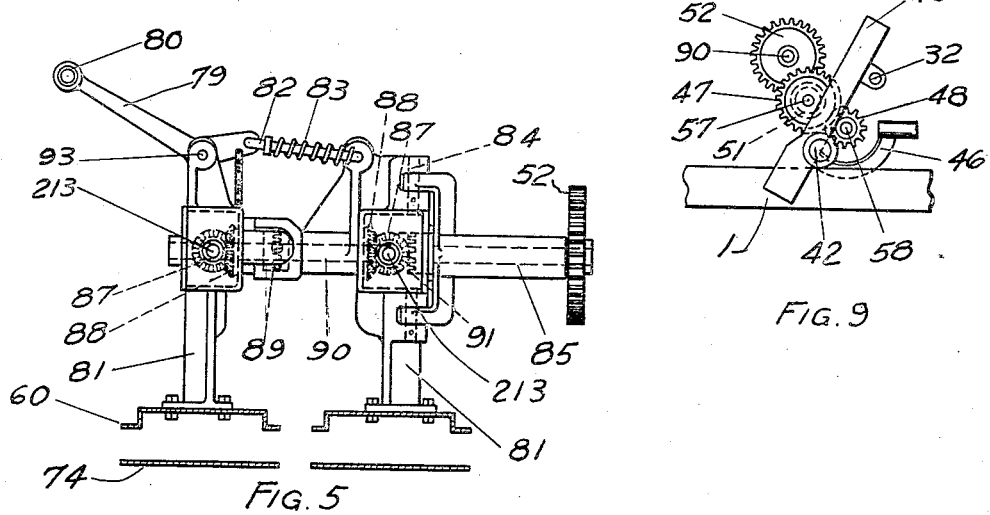
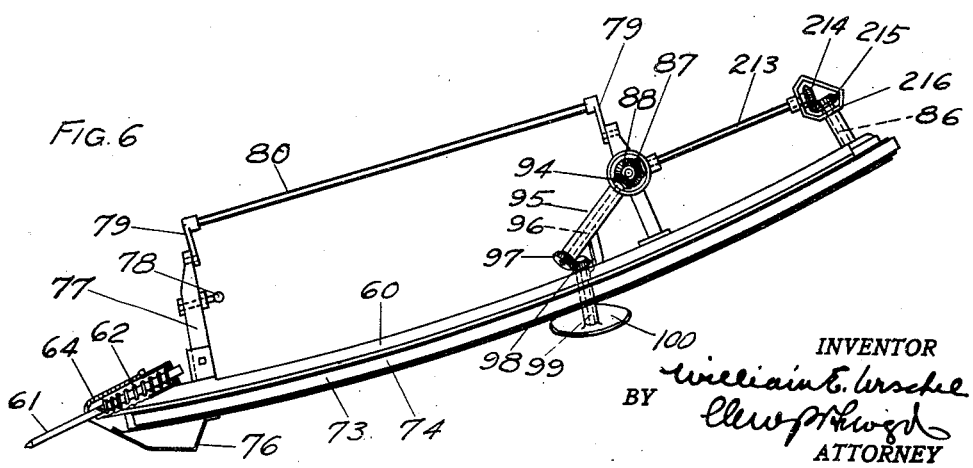
INVENTOR
William E. Urschel
BY
ATTORNEY

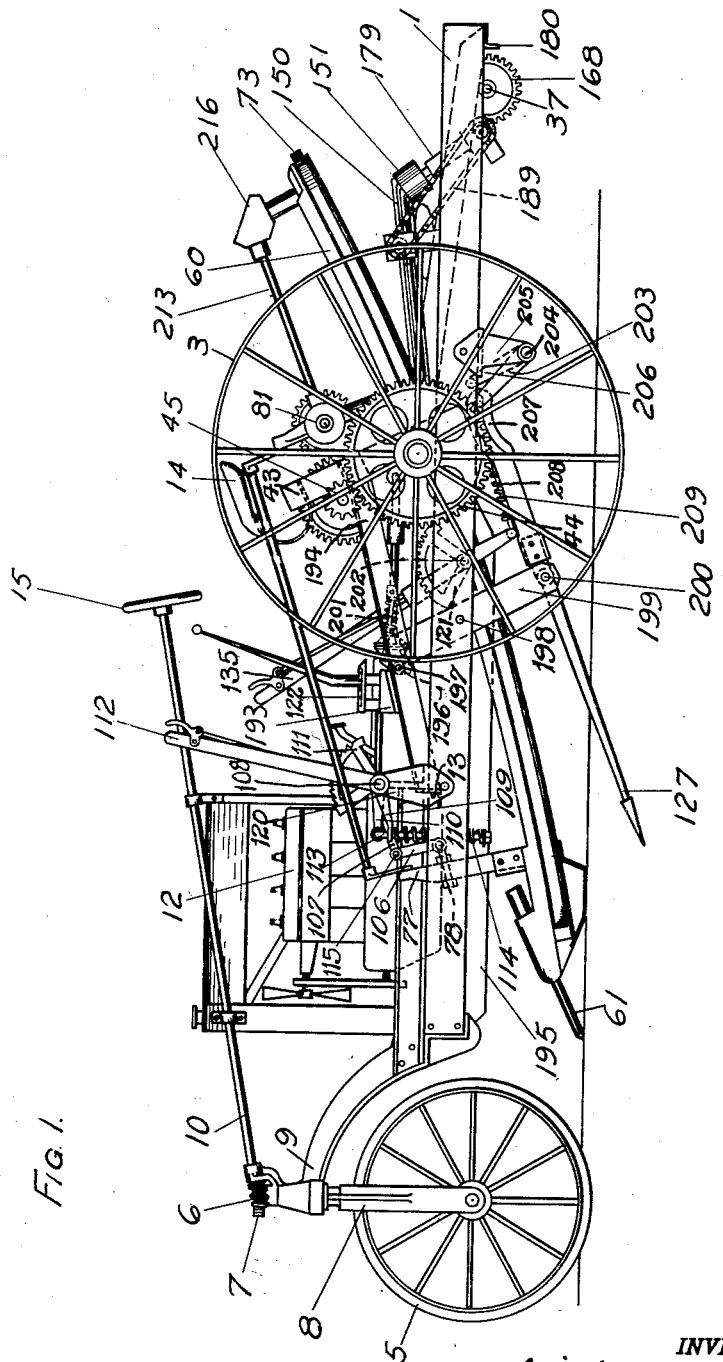

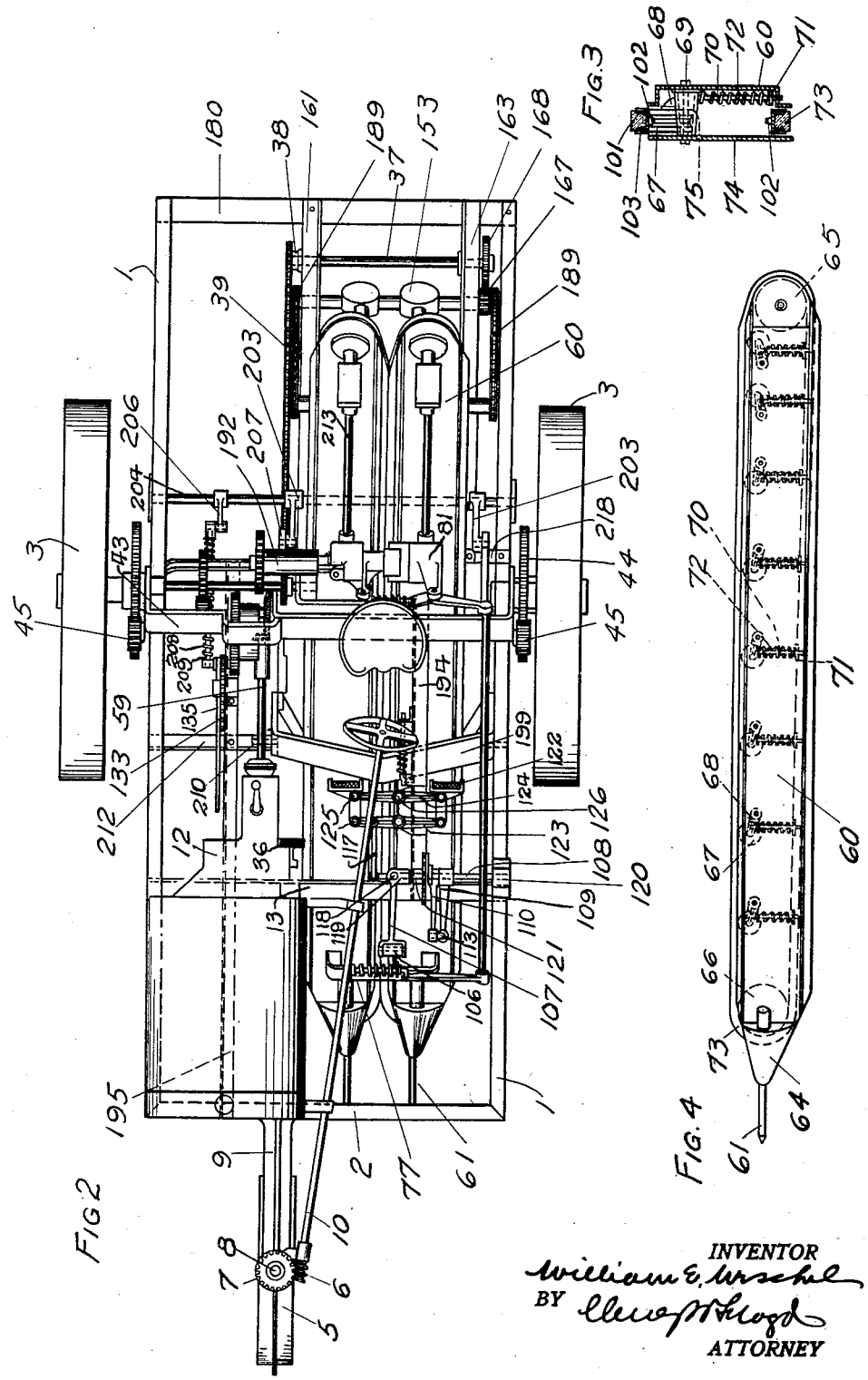

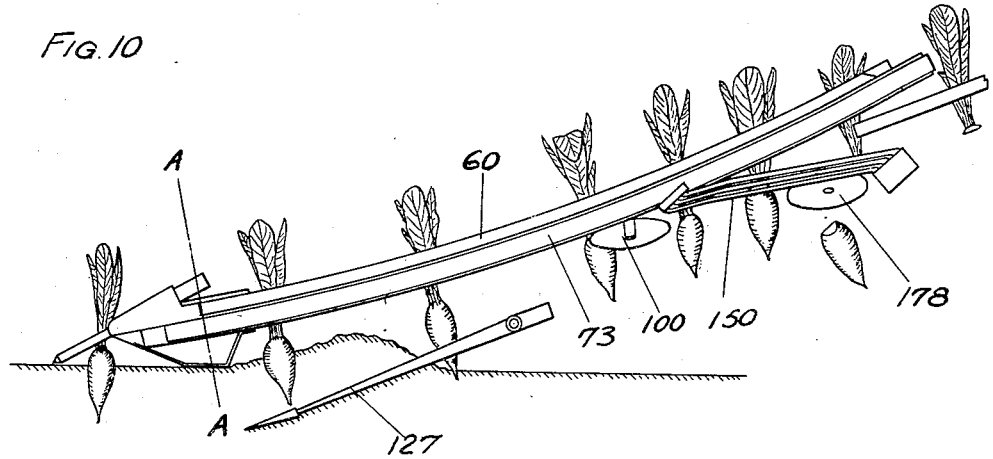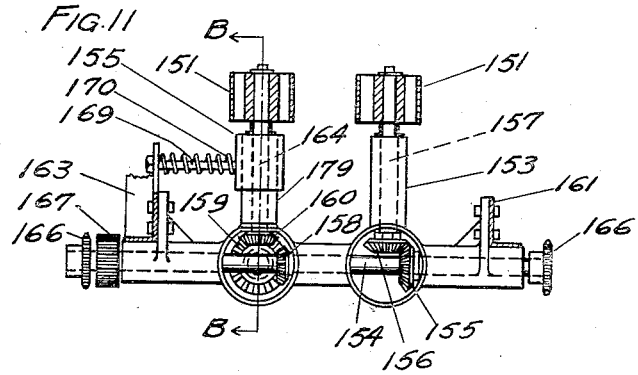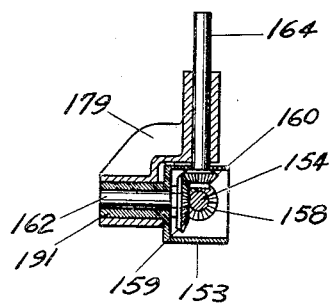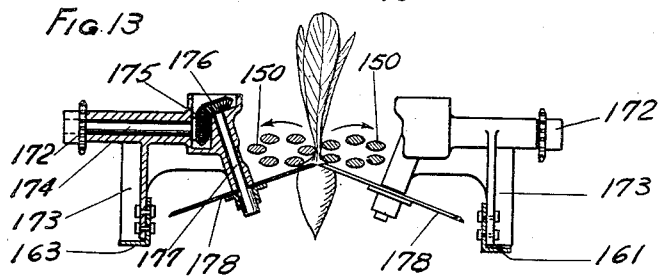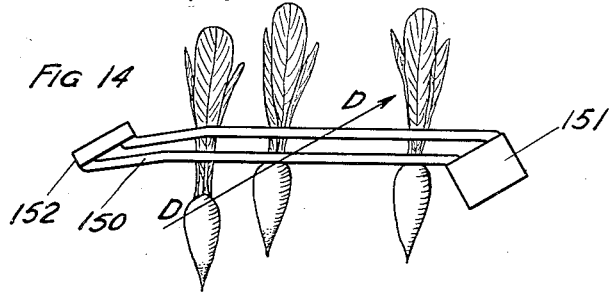

Jan. 17, 1933.     W. E. URSCHEL     1,894,802
BEET HARVESTER
Filed Dec. 5, 1929     5 Sheets-Sheet 5
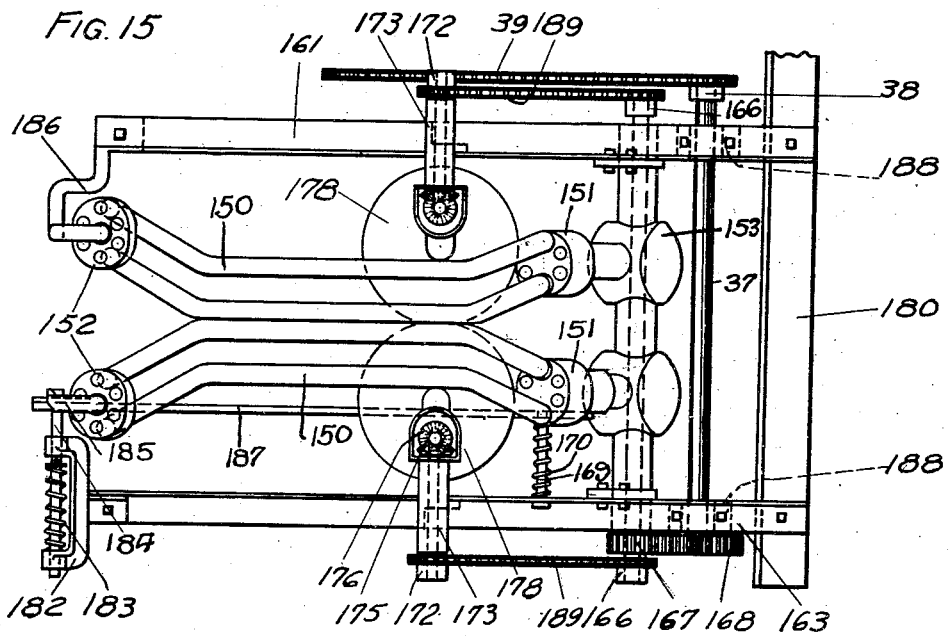
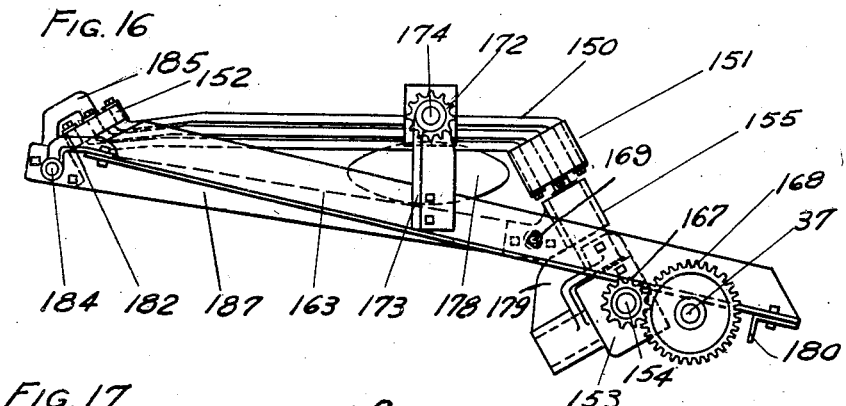
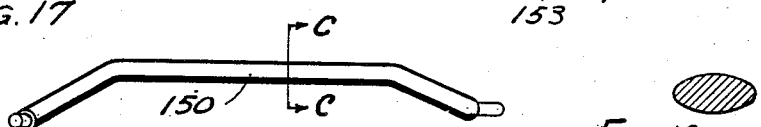
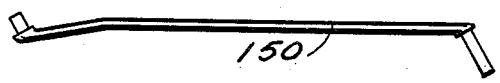
INVENTOR
William E. Urschel
BY
ATTORNEY Patented Jan. 17, 1933

1,894,802

UNITED STATES PATENT OFFICE

WILLIAM E. URSCHEL, OF VALPARAISO, INDIANA

BEET HARVESTER

Application filed December 5, 1929. Serial No. 411,722.

The present invention relates to a harvesting machine, and has particularly to do with a device particularly fitted for harvesting sugar beets, although its utility is not in any manner limited to that crop.

The invention contemplates a power driven device adapted, first, to gradually elevate a soil-embodied crop to effect the removal of such crop from the soil, next, to convey the crop into a position where it is uniformly disposed in respect to severing members, and thereafter, to sever by such members the appendages and a portion of the top section from the crop.

The present invention is a modification of applicant's device illustrated in application of Serial Number 357,625, filed April 24, 1929, there being numerous changes and improvements over this earlier application.

The harvester is so constructed and arranged that the conveyors therein are positioned to elevate the crop to a height from which it may be discharged into a wagon traveling alongside of the apparatus, or into a suitable receptacle which may be arranged upon the harvester itself.

Harvesters of conventional construction have not proven entirely efficient, and this is particularly true in respect to harvesters for sugar beets. Sugar beets sometimes are tenaciously held in the soil. An abrupt pull upon the tops of such beets heretofore has been the conventional manner of dislodging such a crop from the soil. Such handling, however, has resulted in a number of the beets being left in the ground because of the separation of the appendages without dislodging the root crop. In fact, the proportion of the crop not removed by mechanical harvesters has made the heretofore proposed devices unsuccessful commercially.

Additionally, sugar beets are very irregular in growth. Some of the beets grow entirely beneath the surface of the soil, while other beets project above the ground in various proportions. There is no accurate gauge to determine the proportion of the beet body which will be submerged beneath the soil. Some beets appear to be wholly out of the ground except for a few straggling thready roots.

In sugar beets, unlike most other root crops, it is desirable to remove a top part of the body of the beet. Such part, which is relatively small in proportion to the body of the beet, is low in sugar content, and is so tough that it is injurious to the various machines which are used in the various processes of recovering the beet juice for the purpose of the production of sugar.

The present invention not only provides for the efficient gathering of the beets, whether entirely submerged in the soil, or whether merely resting thereupon, but for the removal of the leaf appendages with a portion of the top of the root which is undesirable.

Knives have heretofore been employed upon a few types of harvesters, and, when so employed, some of these have been mounted beneath the pulling members of the harvester. This has been one of the conventional manners in which such knives have been mounted, but none of these cutting devices have proved wholly satisfactory because the action of such knives has been more or less irregular, some crops being hardly touched by the knives, while others have been completely cut away. All of these difficulties are rectified in the present instrumentality which produces an extraordinarily uniform result in respect to removing limited portions of the beets along with the leaf appendages.

It is desirable to provide adjustments for harvesting instrumentalities to enable a wide range of effective variances in the positions of the several elements connected therewith in order that the harvester may be made effective with respect to normal crops and also with respect to abnormal growths or conditions. Such adjustments are necessary in order to harvest varying crops without injury thereto. Compensating adjustments are highly desirable when the direction and magnitude of the growth of a crop and the ease of its removal from the ground are highly variable factors. It is believed that the present apparatus fully compensates for any factor hereinabove mentioned, or any other factor which may be met in the harvesting of sugar beets and similar root crops.

Included in the objects of the invention, among others, are the following:

An improved means for imparting a gradual lift and a concurrent pull upon a soil embodied crop to effect its removal from such soil.

An improved means for conjointly lifting and pulling a soil embodied crop from the soil.

An improved means for conveying a crop along a predetermined path along which the apparatus has instrumentalities for severing parts of the harvested crop.

A new and improved means for determining the point at which a harvested article shall be acted upon by severing instrumentalities or tools.

Novel means for harvesting a crop, like sugar beets, and conveying such crop past cutters whereby a portion of the beets and the appendages of such beets are removed therefrom.

Novel means for regulating the position of a beet, or other object, as it approaches cutting members or other instrumentalities.

Means for separating the appendages from the root portion of a crop.

The combination of elevating means with guide means for determining the position which a crop will occupy when engaging severing means.

Other objects and advantages will appear from the hereinafter given description of the single embodiment of the present invention illustrated in the accompanying drawings, hereby made a part of this specification, and in which:—

Figure 1 is a side elevation of a complete machine possessing the features of the present invention;

Figure 2 is a plan view of the harvesting device shown in Figure 1;

Figure 3 is a transverse section of a puller frame, two of which are used in the machine illustrated in Figures 1 and 2;

Figure 4 is a plan view of one of such puller frames;

Figure 5 is a rear view of an arch support for the puller members showing a spreader device therefor;

Figure 6 is a side elevation of a crop puller and pertinent parts;

Figure 7 is a transverse section, partly in elevation, illustrating the transmission frame and drive for the machine;

Figure 8 is a detail side elevation of the bull wheel driving mechanism;

Figure 9 is a detail elevation of the puller drive;

Figure 10 is a diagrammatic side elevation illustrative of the operations of the machine, showing the relative positions of the crop pulled, the plow, and the guide roller bars;

Figure 11 is a sectional detail of the rear support for the guide roller bars;

Figure 12 is a cross section of the rear roller bar support taken on the line B—B of Figure 11;

Figure 13 is a rear view, partly in section, of knife supporting brackets illustrated in preceding views;

Figure 14 is a diagrammatic side elevation showing the guide roller bars illustrative of the effect of their rotation;

Figure 15 is a detailed plan view of the guide roller bars showing the drive therefor and the frame for their support;

Figure 16 is a side elevation of side roller bars and pertinent parts;

Figure 17 is a plan view of a roller bar;

Figure 18 is a side view of a roller bar; and

Figure 19 is a transverse section of a roller bar taken on the line C—C of Figure 17.

Like reference characters are used to designate similar parts in the drawings and in the description of the invention hereinafter given.

For convenience of description and full understanding, the machine may be divided roughly into its several units, as, for example, its frame, its transmission mechanism, the pullers, and the cutting mechanism. These are described separately.

The frame construction

For the details of the frame structure, reference should be had primarily to Figures 1 and 2, which figures may conveniently be read conjointly. A main frame for the apparatus may comprise two or more longitudinally disposed parallel main frame members 1, secured together by a plurality of transverse frame members, such as the members 2. In the present instance two members 2 are employed in conjunction with other transverse members. Assisting in maintaining the frame members 1 in parallelism is transmission frame 43 which is best illustrated in Figure 7.

At each side of the main frame are bull wheels 3, which bull wheels support the frame above the ground. These wheels are rotatably mounted upon stub axles 42, the latter being secured in the transmission frame 43. Ring gears 44 are securely fastened to each of the bull wheels 3 by the employment of bushings 41.

In juxtaposition to the front transverse member 2 and intermediate said member 2 and the transmission frame 43 is another transverse frame member 13. Between the forward transverse member 2 and said transverse member 13 and at the right hand side of the machine (Figure 1) is any conventional form of suitable internal combustion engine designated 12. This engine constitutes the prime mover for driving the harvester and its many parts.

In a supporting bracket 9 at the top and front of the machine is a fork 8, and within the fork 8 is disposed a front or guide wheel 5. Said wheel is freely rotatable in the fork 8, and said fork 8 is mounted for free rotation in the bracket 9.

Upon the fork 8 is a gear 7. For the purpose of rotating such gear, which rotates the fork 8, there is upon a steering rod 10 a worm 6 meshing with said gear. Rotation of the steering rod 10, which is mounted in suitable brackets disposed upon the front transverse member 2 and the transverse member 13, is a steering wheel 15.

In juxtaposition to the steering wheel 15, and mounted upon the transmission frame 43 is a driver's seat 14 which may be of any suitable configuration and style.

In operation, an operator seated in the seat 14 is adapted not only to control the speed of the engine 12 and the bull wheels 3, but this operator also controls the course of the harvester by adjustment of the steering fork 8 through the steering wheel 15, rod 10, and gears 6 and 7. Thus the operator is enabled to direct the machine to travel down a row of sugar beets, or other crop, and, when the end of such a row is attained, to steer the machine into operable relation to some other row of crop, or elsewhere as needs demand.

The transmission

Extending rearwardly from the engine 12 and to a bearing bracket 46, which is mounted on said transmission frame 43 (see Figure 8), is a clutch shaft 59. A pinion 50 is secured to said shaft 59. Said pinion 50 drives a bevel gear 49 which is keyed to a transverse shaft 58, which latter shaft rides in suitable bearings provided therefor in the transmission frame 43.

A pinion 54 is secured upon shaft 58 and drives a ring gear 55 which is mounted upon a conventional form of differential, designated generally 56. A shaft 32 journalled in the transmission frame 43 extends from the differential 56, and pinions 45 secured to such shaft drive ring gears 44 which, as has been previously pointed out, are securely fastened to bushings 41. The bull wheels 3 are secured to said bushings 41 and are rotatably mounted on axles 42, as previously recited. A clutch mechanism upon the engine 12 is controlled from the operator's seat 14 by a conventional clutch controlling pedal 36. It is in this manner that the engine 12 is coupled to the drive wheels 3 to give tractive effort to the harvester.

Another shaft 57 is journalled in the transmission frame 43, and is arranged transversely in respect to main frame member 1. It is driven by a gear 48 fastened to said shaft 58 which meshes in a gear 47 secured to said shaft 57. Said shaft 57 also carries a gear 51 which meshes with a gear 52, the latter being attached to a puller shaft 90. In reading Figure 7, reference should also be had to Figures 8 and 9. Thus the crop pullers are actuated to operate as is later described.

Also, upon said shaft 57 is a sprocket 53 (Figure 7) which drives a chain 39 (Figure 15). The chain 39 rotates about a sprocket 38 which is secured to a roller bar shaft 37. The operation of the roller bars will be later described.

The puller mechanism

Mounted upon the left side of the machine (Figure 1) are paired and oppositely disposed puller frames 60 plainly shown in Figure 2. At their front end, the puller frames 60 are held in spaced relation by an arch bracket 77 (Figure 6).

A second arch bracket 81 is at the rear end of the puller frames 60 (Figure 2). In said bracket 81 are bearings for two longitudinal shafts 213, and the driving members therefor (see Figures 5 and 6).

The puller frames 60 are supported upon the transmission bracket 43 by a bracket 192. A clevis 85 (Figure 5) is arranged to turn freely in the bracket 192 whereby to permit the forward end of the puller frames 60 to be raised or lowered.

Said clevis 85 provides a bearing for the shaft 90, heretofore mentioned, and which is secured to a gear 52. The shafts 213 are driven from shaft 90 by two bevel gears 87 and 88 (see Figure 5).

Within the puller frames 60 are end sprockets 65 and 66, the periphery thereof providing guiding means for a puller chain. Sprocket 65 is secured to a shaft 86 (see Figure 6) which is driven by shaft 213, the intermediate gears being designated by the numerals 214 and 215. In order that the shafts 213 and 86 shall have suitable bearings, a bracket 216 is provided for each of the puller frames 60 (Figure 6).

Clevis 85, at the rear, is hinged to the rear arch bracket 81 by pins 84. These permit the front end of the puller frames 60 to be guided transversely in keeping with irregularities in the row of a crop, thus compensating for the physical inability of an operator to drive the machine, as a whole, with a sufficient degree of accuracy to provide for exact registration at all times with a crop.

In order that the puller frames 60 may be moved transversely, a flexible joint 91 (see Figure 5) is mounted upon the shaft 90 at the point where the arch bracket 81 and the clevis 85 are hinged.

About the sprockets 65 and 66, the former being the drive sprocket, and the other being a guide roller pulley, a stalk puller chain moves. Said chain comprises a rubber or elastic part and includes chain links which rotate upon sprockets 65 and 66 and upon which the rubber or elastic parts are seated.

A full and complete description and illustration of the driving sprockets 65 and 66, and the chain and belt thereabout, is to be found in the copending application of William E. Urschel, the inventor here, Serial Number 342,032, filed February 23, 1929, entitled "Bean harvester", and in other applications for Letters Patent in the name of the present applicant.

In view of this previous complete disclosure of the character of stalk puller chain there shown and here employed, the present drawings do not illustrate in such great detail the structural features of the puller chain, which is designated generally 73. The description of the chain is somewhat limited also, although it is believed to be, as presented, entirely satisfactory for the purposes of the present application.

The chain 73 comprises a channeled member having flanges with eyes therein, each link being designated 101, and having upon the back thereof a projecting lug 102. Intermediate each pair of main links 101 are a pair of side plates 103. Each of the side plates 103 carries two apertures, and the connection between the links 101 and the side plates 103 is by means of rivets. The ends of the rivets project internally to provide engaging members, the purpose of which will be later pointed out.

Riding in the links 101 of the said puller chain 73 is an endless belt of yielding material, such as soft rubber. The projecting internal ends of the rivets hereinabove referred to project into grooves arranged at each side of the elastic belt, the grooves being continuous and coextensive with the length of the belt and identical upon each side thereof. The rivets thus retain the rubber portion of the chain in the channel of the links 101 while the sprocket 65 is driving said chain positively through the engagement of the teeth of the sprocket with the lug teeth 102, one of which is upon the back of each link 101.

As hereinabove pointed out, the forward end of the puller frames 60 includes an idler sprocket wheel 66. The stalk puller chain 73 intermediate the idler 66 and the drive sprocket 65 is pressed outwardly of the frames 60 by a plurality of spring actuated idler rollers 67 shown in Figure 4, these idler rollers being rotatably journalled in pivoted arms 68. Pivoted arms 68 are urged outwardly by compression springs 72 mounted upon rods 70.

One end of each rod 70 is mounted for reciprocal movement adjacent to free end of the pivoted arms 68 and the other end of said rod 70 is secured in the puller frames 60. The springs 72 exert a resilient force upon the idler rollers 67, thus providing sufficient tension to cause the chain 73, where the sections of the said chain 73 and of the opposed puller frames 60 are contiguous, to grip and to hold an exposed portion of a crop top, such grip being of a firm but not destructive character, while the crop is being elevated from the ground.

The tension of the compression rings 72 may be adjusted by take-up nuts 71. One take-up nut 71 is provided with each rod 70, so that it is a relatively simple matter to provide the various rollers 67 with different spring tensions, in order that the crop may be held progressively tighter, or more loosely, as it travels from the front end to the rear end of the puller frames 60 while held securely therebetween by the resilient or rubber belts 73. Normally the adjacent faces of the chains 73 are contiguous or substantially contiguous for the entire inside faces of the puller frames 60.

Over the under face of each puller frame 60 is a bottom plate 74 (see Figure 3) secured thereto by bolts 69 passing through spindles 75, on which spindles 75 the arms 68 are mounted. At its front end, the bottom plate 74 terminates in a shoe 76 serving to guide the puller frames over the ground at a predetermined height therefrom (see Figure 6.)

Also, at its forward end, the puller frame 60 includes a tapered portion 64 which guides the exposed leaves of a crop upwardly over the top surface of the puller frames 60 and intermediate the rubber tired puller chain 73. Pointed rods 61 are reciprocally mounted in the forward end of the puller frames 60. Said rods 61 project forwardly beyond the puller frames 60, and are positioned at an angle to move in close proximity to the adjacent ground, whereby to raise from the ground any part of the exposed portion of the crop, such as the leaves, which may be recumbent upon the ground.

In order that the rods 61 shall be resiliently mounted, compression springs 62 are disposed between the rods 61 and the puller frames 60 to exert an urging force upon the rods 61 to force them outwardly of the puller frames 60. Should the rods 61 encounter an obstruction, said rods, or either of them, are forced into the puller frames 60, thus permitting the rounded nose of the puller frames 60 to slightly pass over the obstruction.

By employing a pair of oppositely disposed similar puller frames 60 urged together by the spiral spring 83 (see Figure 5), the puller frames 60 may be made to separate slightly or widely, as necessity demands. Levers 79 are mounted upon each of the arch brackets 77 and 81 by means of bolts 93 and are joined together by a tubular member 80 (see Figure 6).

Referring particularly to Figure 5, it will be noted that one end of a rod 82, around which said coil spring 83 is disposed, is mounted in one arm of said lever 79. The other end of said spring rod 82 is mounted reciprocally in arch bracket 81.

In the event a stone or other incompressible foreign object is wedged between the stalk puller frames 60, i. e., between chains 73, the tension upon springs 83 may be relieved. This is accomplished by raising the tubular member 80. Such movement lowers the horizontal plane of the spring rods 82, by the movement of levers 79, and such movement also draws apart the puller frames 60. In order that the puller frames may move relatively to one another, a flexible joint 89 is mounted on shaft 90 at the points where the arch bracket 77 and 81 are hinged.

From reference to Figure 2, it will be noted that the puller frames 60 are supported at their front end by a bevel crank 107, the latter being secured to an extended pivot pin 78 by a connecting rod 106 (Figure 2). Connecting rod 106 and bevel crank 107 are held together by a pin 115. Connecting rod 106 is secured to said pivot pin 78 by a ball and socket joint.

Bevel crank 107 is secured within a clevis 119 by a pin 118, the latter being of such construction that it will allow of transverse movement of the puller frames 60 when they are being guided along a row of crop.

Said clevis 119 is secured to a shaft 108 which is rotatably mounted in brackets 120 and 121, said brackets being secured to the transverse frame member 13. An arm 110 is secured to a hand lever 112 and is mounted on shaft 108 so that said shaft 108 is free to turn in said arm 110. An arm 109 is secured to shaft 108. Spring rod 113 is mounted in the arm 110. Said spring 113 is so mounted in arm 110 that it passes through arm 109. A spring 114 is mounted upon rod 113, and exerts a resilient tension upon arm 110 to urge the puller frames 60 into an adjusted position, but permitting of said puller frames 60 to slide over obstructions and uneven ground, the springs 114 compensating for the changes in the position of said puller frames. By hand lever 112 the height of the stalk puller frames 60 may be adjusted by the operator from his seat 14.

In order that the puller frames may register with a row of crop, means for shifting said puller frames 60 transversely of the machine frame to guide them are provided. This is done by foot levers 123 and 124 pivoted to a bracket 193 by a pin 126. Foot rests 122 are mounted on the foot levers 123 and 124 by studs 125, secured in said foot levers 123 and 124. Foot lever 123 is joined to a bevel crank lever 107 by a rod 117. By using two foot levers, the foot rests 122 are at all times in transverse position with respect to the machine.

A lifter 127 is mounted under the puller frames 60 to assist in the elevating of the crop. By the arrangement herein illustrated, i. e., positioning the lifter 127 in juxtaposition and beneath the lifter frames 60, as shown, the crops are actually elevated by the breaking of the ground therebeneath by the lifter 127, the puller chains 73 making the elevation obtained by the breaking of the ground a truly vertical elevation, and permitting of the additional elevation obtained through the chains 73 a relatively simple matter without burdening chains 73 with a pull upon the crops to dislodge them from the ground.

Said lifter 127 is adapted to run into the ground beneath the body portion of a root crop, and is pivoted upon a stud 200 set in an arched member 199. The arched member 199 is mounted on the left hand side on a stud 198, which latter is secured in the main frame 1. The right hand side of the arch shaped member 199 is mounted on a stud secured in a bracket 210.

A safety catch 196 is disposed upon frame member 194 and is pressed against the arch shaped member 199 by a spring 201. In case the lifter 127 strikes an obstruction, the catch 196 will permit of the arched member 199 pivoting on its supporting stud, thus allowing the lifter 127 to rise out of the ground. Such a construction prevents damage to this part of the machine, and also prevents such damage as would result from the machine becoming lodged against movement in accordance with the demands of the traction applied thereto.

The plow or lifter 127 may be controlled from the operator's seat 14. A hand lever 135 is disposed on a pin 202 set in a bracket mounted on a longitudinal frame member 195. A spring rod 209 is secured at one end in said hand lever 135, and at its other end it is reciprocally mounted in an arm 206. The latter arm 206 is mounted upon a shaft 204 which is journalled in bracket 205.

Arms 203, which are secured to shaft 204, terminate with steps which slide within slots 207 in the lifter beam of lifter 127. A spring 208 mounted on the spring rod 209 forces the lifter 127 into the ground as the hand lever 135 is lowered.

*The cutting mechanism*

The mechanism employed to remove the tops with the appendages from the body of a crop comprises primarily two oppositely disposed sets of roller bars (see Figures 15 and 16, et seq.) disposed in the path of a crop elevated and being conveyed by the lifting chains 73. The rollers just referred to operate in such a manner that the appendages of the crop are drawn between the two oppositely disposed roller bar sections, the crops being drawn upwardly within certain limitations by the action of such rollers (see Figures 10 and 14).

To prevent the body of the crop being drawn between the roller bars, two oppositely disposed crowder disks 100 are disposed forwardly of the roller bars (see Figure 10). Because of the angle of the crowder disks 100, relative to the puller frames 60, any crop which is grasped by chains 73 at a point where it will not pass under the roller bars will be pulled downwardly by said disks 100 before the roller bars are reached, thus forcing the body of the crop to pass beneath the roller bars as is necessary for the subsequent operations herein described.

Each of the said crowder disks 100 is secured to a shaft 99 for which suitable bearings are provided in brackets 95 (Figure 6). The brackets 95 are mounted upon the puller frames 60 and upon the rear arch member 81. Bevel gears 98, which are disposed upon shaft 99, are driven by bevel gears 97, the latter being secured to a shaft 96. Bevel gears 94, attached to shaft 96, are rotated by bevel gears 88.

There are two sections of roller bars 150 which are oppositely and complementally disposed. The bars rotate in an opposite direction, it being the purpose of said bars 150 to engage the appendages of a crop, to pull such appendages upwardly between the two sections of roller bars, drawing the root portion of the crop to be brought into close proximity with the lowermost section of the contiguous roller bars. As there is a constant pulling effect upon the appendages by the bars 150, which pulling effect is insufficient to break the appendages from the root, all of the root crop will be drawn upwardly so that, as it travels toward the rear of the machine, under the influence of chains 73, the root portion will be held with its top face in a fixed plane. While so held, the cutting mechanism hereinafter described will operate upon the root in a plane beneath such fixed plane for the top surface of the root.

The roller bars 150 of each section of the device are secured together at the rear end by cylindrical bearing blocks 151 and at the forward end by end bearings 152. The roller bars 150 are free to revolve in said bearings.

Said roller bars 150 have a shape such as shown in Figures 17, 18, and 19, and are held in spaced relation at the rear end by a bearing bracket 153 securely fastened between two longitudinal frame members 161 and 163. The frame members 161 and 163 are supported at the rear by a transverse member 180 which member is secured to the main frame member 1. The forward ends of such longitudinal members 161 and 163 are supported upon the main frame members by brackets 218 (see Figure 2).

The roller bar shaft 37 is journalled in bearings 188, and is driven by sprocket 38 by the chain 39. Gear 168, which is secured to shaft 37, drives a gear 167, fixed to a shaft 154. The shaft 154 is journalled in a bearing bracket 153. The right roller bar section, is rotated by said shaft 154 through the gears 155 and 156. Cylindrical bearing block 151, which furnishes bearings for the right hand roller bars, is securely fastened to a shaft 157.

The left hand roller bar section is resiliently pressed against the right roller bar section by springs 170 and 183. Bearing 179 is rotatably mounted on hub 191 (see Figure 12), which latter is disposed in bearing bracket 153. Such construction allows the roller bar section to spring apart as the appendages of the crop vary in thickness and in volume.

A bevel gear 158, secured to shaft 154, drives a bevel gear 159 fixed to a shaft 162, which shaft 162 is journalled in the hub projection 191 of bearing bracket 153. Bevel gear 159 rotates a bevel gear 160 securely fastened to shaft 164. Bearing block 151 fixed to shaft 164 rotates the left hand roller bar section.

The forward end of the right hand roller bar section is supported by a bracket 186 which is bolted to frame member 161. End member 162 is rotatably mounted on a stud secured in bracket 186. The forward end of the left hand section of the roller bars is supported by a bracket 185 mounted upon a spring rod 184. The left hand end bearing 152 is rotatably mounted on a stud set in bracket 185. The spring rod 184 is reciprocally mounted in a bracket 182, which bracket is bolted or otherwise secured to the frame member 163. The spring 183 urges its force upon the left roller bar section.

At the rear end of the left hand roller bar section is a spring 170, heretofore referred to, which is mounted upon a spring rod 169, one end of which rod is reciprocally mounted in frame member 163. The other end is secured to a brace bar 187. Springs 183 and 170 force the two sections of roller bar members together, and thus supply means for adjusting the pressure exerted upon the two sections which operate at all times under the urging influence of springs for the purpose of maintaining them in adjusted relation. The means for driving the roller bar sections has hereinbefore been described.

The exposed or upper portion of a crop is sheared or otherwise severed in the present machine. The appendages are removed by means of a pair of oppositely disposed circular cutters 178, mounted directly in the path of the crop (see Figure 13). The path referred to is the path which the crop assumes when being held between the two roller bar sections, and as it approaches the end of the roller bar sections, at all times being under the elevating influence of the puller mechanisms 60.

Cutters 178 are fixed to shafts 177, which impart opposed rotation to the cutters 178. Shafts 177 are journalled in brackets 173, and are driven by shaft 174 by two bevel gears 175 and 176. Sprockets 172, secured to shaft 174, are driven by sprockets 166, securely fixed to shaft 154, through a chain 189.

*General remarks*

With the arrangement of the parts hereinabove described, it will at once be apparent that a machine has been provided in which the pulling instrumentalities 73 are adapted to grasp the exposed appendages of the soil embodied crops to gradually elevate them along a predetermined path to effect the removal thereof from the soil and to sever the appendages therefrom. The soil elevator 127 assists the chains 73 in taking the crop from the soil.

The mouth of the pulling means in this instance defined by the cooperating puller units 60 is guided in a line coinciding with the linear path along which crops usually are planted so that the contacting faces of the flexible puller chain 73 will yieldably grasp the exposed portions of the crop and carry and elevate them along an arcuate path having a gradual incline to slowly pull the crop from the coil, this being aided and abetted by the soil lifting efforts of the elevator plow 127.

The crop is first engaged by the pulling members on line A—A (see Figure 10). As the crop is carried rearwardly, the lifter 127 which cooperates with pullers 73, loosens the ground about the crop and pushes or lifts the crop from the ground.

The crops freed from the soil are carried to the topping instrumentalities. Before reaching these devices, the crop is adjusted in the device by the crowder discs 100, so that all of the crop will pass under the roller bar sections. As the crop is carried rearward by chains 73 the appendages of the crop are drawn between the two sections of roller bars, or, means for moving the crop transversely to the direction of the conveyor.

When the appendages of the crop are pulled between the roller bar sections, such appendages are drawn axially of said crop and up between the roller bar sections until the body of the crop is against the lowermost roller bars. Because of the angle of the end bearings 151 and 152 in respect to the roller bars 150, the crop continues to be conveyed rearwardly by the roller bar sections as the upper sections of the appendages are gripped by the rubber tired chains 73. Thus there is provided means moving transversely to the direction of the conveyor and gripping the crop appendages for moving the crop normally to the conveyor. This is illustrated in the diagrammatic Figure 14. The crop moves lengthwise of the roller bar sections without impedance.

The crop is carried rearwardly in the line indicated by the line D—D (Figure 14) until the body of the crop is against the roller bars after which the crop is carried in a line parallel with the roller bars. In this machine the angle between the face of the end bearings and the roller bars is about thirty degrees.

With this angle the crop will be drawn upwardly approximately three and one-half inches to every six inches that it is carried rearwardly. This ratio, however, may be changed to suit conditions. The rate of speed at which the crop is carried rearwardly by the roller bars is naturally the same as the rate of speed of the rubber tired chains 73.

As the crop is carried rearwardly by the roller bars, it is carried through the abutting edges of the oppositely disposed cutters 178 positioned as shown in Figure 13. Said cutters sever the appendages and the crown or top part of the crop from the body of the crop. The cutters 178 may be adjusted to cut any desirable portion from the top of the crop.

When severed from the appendages, the body of the crop falls to the ground or into a suitable container which may be provided (not shown). Conveyors may be provided to elevate the crop into a wagon or receptacle. The appendages of the crop are discharged from the machine at the back end of puller frames 60.

To adapt the machine to crops such as the red beet or carrots, when it is desirable to remove the appendages close to the body of the crop, the cutters may be removed. The pressure of the springs 183 and 170 is then increased to such an extent that the body of the crop will be drawn up against the roller bars and the appendages of the crop will be pinched, crushed, or otherwise severed from the body of the crop. This is possible whenever the appendages are relatively tender and are readily broken from the root.

Roller bars 150 do not rotate and are spaced so that the bars of one section, when contiguous to the bars of the other section, lie in different horizontal planes, a bar of one section at the inner sides of said sections always being between two bars of the opposite section (see Figure 13). In passing through the horizontal plane defined by the innermost reach of the bars of both sections, the bars of one section alternate with the bars of the other section, the bars of both sections moving upwardly to bisect such plane first at one side and then at the other.

The result of the operation of the sets of bars 150 is to pull the foliage of a plant therebetween until the root portion engages the bars 150 to prevent further lifting, the bars 150 because of the pitch of members 151 and 152 constantly conveying the plant in a path between the two sections of roller bars independently of the movement imparted to the plants by the carrier chains 73. The movement of roller bars 150 is synchronized to move the plants therebetween at the same speed and in the same direction as the chains 73 convey such plants.

The present invention is a modification of applicant's device illustrated in Patent No. 1,727,020, there being numerous differences in structure and arrangement.

I claim:—

1. The combination with a cutting means, of a conveyor for a root crop, and means moving transversely to the direction of said conveyor and gripping the crop for adjusting the position thereof normal to its movement in said conveyor and relatively to said cutting means.

2. The combination with a cutting means, of a conveyor for root crops whereby a crop therein is conveyed past said cutting means, and means moving transversely to the direction of said conveyor and gripping the crop for moving said crop normally to said conveyor while therein to adjust it relatively to said cutters.

3. A cutting means for root crops, in combination with a conveyor grasping a crop by its appendages to carry it past said cutting means, and means moving transversely to the direction of the movement of said conveyor also gripping the crop appendages for adjusting the position of the root portion of said crop relatively to said cutting means while the appendages of said crop are held in said conveyor.

4. The combination of a conveyor carrying root crops by their leaves, a cutter for severing the leaves from the root portions, and means moving in a direction substantially transverse to the movement of said conveyor gripping the leaves for adjusting the position of said roots relatively to said cutters and normally to their movement in said conveyor.

5. The combination of a conveyor for root crops engaging such crops by their leaves, of a cutter acting to sever the root and leaves, and crop adjusting means moving in a direction substantially transverse to the movement of the conveyor and gripping the portion of the leaves beneath that part held by said conveyor to move said crop in said conveyor in a direction normal to the advancing movement of the crop in said conveyor.

6. Elevating means for soil embedded crops having leaf appendages, comprising a plurality of parallel bars transversely engaging said appendages and adapted to draw said appendages away from the root portion.

7. Root crop elevating means comprising paired complemental bars arranged in series, and means for moving each series of bars about an axis, the paths of movement of bars of opposite series being in proximity to admit of the passage of the leaf appendages therebetween.

8. The apparatus described in claim 7, and in which opposed bars, when in proximity, provide stop means defining a position for the root crop.

9. Elevating means for a root crop comprising two series of roller bars in parallelism moving in opposite directions and disposed in close proximity, the roller bars engaging the foliage of a root crop axially of said crop to draw such foliage therebetween while maintaining the root crop upon the opposite side of the rollers.

10. Elevating means for a root crop comprising a movable bar member, and means for moving said bar member, the movement of said bar member being in a direction axially of the root portion of a crop toward the foliage thereon.

11. Means for adjusting the top surface of root crops to an instrumentality adapted to operate thereon, comprising two series of roller bars, each series having a plurality of individual roller bars and bearing members therefor, and means for rotating said bearing members to cause said each series of roller bars to move in opposite directions and define a narrow path therebetween, said roller bars being adapted to draw the foliage of a root crop therebetween axially of said crop while maintaining the root portion of the crop in a predetermined position relative to the opposite side of said roller bars.

12. In a harvester, a pair of roller bar members adapted to grasp the foliage of a root crop and movable about different axes to draw the root toward said members and longitudinally thereof.

13. In an agricultural device for a plant having a crop portion and foliage, bars moving in opposed arcuate paths and engaging the foliage to draw it away from the crop.

14. In an agricultural device for a plant having a crop portion and foliage, bars moving in opposed intersecting paths and engaging the foliage to draw it away from the crop.

15. In an agricultural device for a plant having a crop portion and foliage, bars moving in opposed arcuate paths and engaging the foliage to draw it away from the crop, and means for moving said bars.

WILLIAM E. URSCHEL.